United States Patent [19]

Fathauer et al.

[11] 3,821,651

[45] June 28, 1974

[54] SCANNING CONTROL CIRCUIT FOR USE IN SIGNAL-SEEKING RADIO RECEIVER

[75] Inventors: George H. Fathauer, Decatur, Ill.; Cecil E. Mathis, Indianapolis, Ind.

[73] Assignee: Masco Corporation, Cumberland, Ind.

[22] Filed: Nov. 2, 1972

[21] Appl. No.: 303,010

[52] U.S. Cl. .................. 325/470, 325/334, 325/458

[51] Int. Cl. ........................................... H04b 1/32

[58] Field of Search ............ 334/17, 18, 29; 325/31, 325/332, 334, 335, 419, 420, 423, 468, 469, 470; 343/205, 206

[56] References Cited

UNITED STATES PATENTS

| | | | |
|---|---|---|---|
| 3,614,621 | 10/1971 | Chapman | 325/469 |
| 3,617,895 | 11/1971 | Tomsa et al. | 325/469 |
| 3,714,585 | 1/1973 | Koch | 343/206 X |

*Primary Examiner*—Benedict V. Safourek
*Attorney, Agent, or Firm*—Gust, Irish, Lundy & Welch

[57] ABSTRACT

For use in a signal-seeking radio receiver for automatically and sequentially tuning to a plurality of predetermined radio frequencies, the receiver including means for reproducing the intelligence in radio frequency signals received at said predetermined frequencies, the combination comprising local oscillator means for generating a plurality of different local oscillator signals and a switching circuit for automatically and sequentially activating predetermined portions of the local oscillator means thereby sequentially and repetitively to generate the aforementioned plurality of local oscillator signals individually and in a predetermined sequence. A pulse generator is provided for sequencing the switch means at a first predetermined stepping rate thereby to tune the receiver to receive radio frequency signals for a first predetermined time period at each of said frequencies in sequence. The receiver further includes means for holding said receiver tuned to individual ones of said predetermined radio frequencies in response to reception of a radio frequency signal thereat after a predetermined delay period shorter than said first predetermined period. The switching circuit further includes means for increasing the stepping rate of the pulse generator in synchronism with tuning of said receiver to selected ones of said radio frequencies to thereby reduce said first predetermined period to a period less than said delay period, whereby the receiver cannot "lock" onto the selected frequencies.

19 Claims, 5 Drawing Figures

PATENTED JUN 28 1974 3,821,651

| I. C. NO. | PIN | COUNT 1 | 2 | 3 | 4 | 5 | 6 | 7 | 8 |
|---|---|---|---|---|---|---|---|---|---|
| 254, 256 | 5 | 0 | 0 | 0 | 0 | 1 | 1 | 1 | 1 |
| | 6 | 1 | 1 | 1 | 1 | 0 | 0 | 0 | 0 |
| | 8 | 1 | 1 | 1 | 1 | 1 | 1 | 1 | 1 |
| | 9 | 0 | 0 | 0 | 0 | 0 | 0 | 0 | 0 |
| 250, 252 | 5 | 0 | 1 | 0 | 1 | 0 | 1 | 0 | 1 |
| | 6 | 1 | 0 | 1 | 0 | 1 | 0 | 1 | 0 |
| | 8 | 1 | 1 | 0 | 0 | 1 | 1 | 0 | 0 |
| | 9 | 0 | 0 | 1 | 1 | 0 | 0 | 1 | 1 |
| 270 – 276 | 8 | * | 1 | 1 | 1 | 1 | 1 | 1 | 1 |
| | 11 | 1 | * | 1 | 1 | 1 | 1 | 1 | 1 |
| | 6 | 1 | 1 | * | 1 | 1 | 1 | 1 | 1 |
| | 3 | 1 | 1 | 1 | * | 1 | 1 | 1 | 1 |
| 262 – 268 | 3 | 1 | 1 | 1 | 1 | * | 1 | 1 | 1 |
| | 6 | 1 | 1 | 1 | 1 | 1 | * | 1 | 1 |
| | 11 | 1 | 1 | 1 | 1 | 1 | 1 | * | 1 |
| | 8 | 1 | 1 | 1 | 1 | 1 | 1 | 1 | * |

SCANNING CONTROL CIRCUIT FOR USE IN SIGNAL-SEEKING RADIO RECEIVER

BACKGROUND OF THE INVENTION

1. Field of the Invention

The present invention relates to signal-seeking radio receivers of the type disclosed in U.S. Pat. No. 3,531,724, which is assigned to the same assignee as the present invention, and in particular, discloses an improved scanning control circuit for use in such a receiver. The scanning control circuit provides for increased scanning speed of selected channels in synchronism with tuning of the receiver thereto whereby the receiver is unable to lock onto those channels.

2. Description of the Prior Art

Signal-seeking radio receivers are well known in the prior art. Typically, such receivers are capable of scanning a selected radio frequency band or bands until the receiver tunes to a radio frequency signal within the band whereupon the receiver locks or holds itself tuned to that frequency.

A more recent development in the art of signal-seeking radio receivers is the provision of such a receiver which, rather than sweep or analog tuning through the entire band, automatically and sequentially step tunes to individual ones of a predetermined plurality of radio frequencies. Typically, this latter type of receiver incorporates a plurality of frequency determining elements such as crystals, and the step-scanning operation is performed by means of an electronic switch which automatically and sequentially connects the frequency-determining elements into the receiver circuit. Such a receiver is disclosed in the above-referenced U.S. Pat. No. 3,531,724.

Further, these step-scanning receivers are typically provided with means for disabling selected ones of the predetermined frequencies whereby the receiver cannot tune to those frequencies. However, in prior art step-scanning receivers, the receivers continue to scan each of the predetermined frequencies at the same scanning rate irrespective of whether or not the channel is active or inactive. Correspondingly, the scanning cycle of the receiver, i.e., the time required for the receiver to scan the entire band or spectrum of frequencies, remains the same irrespective of how many channels are being actively scanned.

SUMMARY OF THE INVENTION

The present invention provides an improved scanning control circuit which enables the receiver to scan selected channels at a substantially faster scanning rate thereby preventing the receiver from locking onto the selected channels and reducing the scanning cycle of the receiver in direct proportion to the number of selected channels.

Broadly, the invention comprises a scanning-control circuit for use in a signal-seeking radio receiver for automatically and sequentially tuning to a plurality of predetermined radio frequencies and means for reproducing intelligence therein. The combination comprises a local oscillator means for generating a plurality of different local oscillator signals and a switching means for automatically and sequentially activating predetermined portions of the local oscillator means to thereby generate said plurality of local oscillator signals individually and in a predetermined sequence. A switch-driver means or pulse generator is provided for sequencing the switch means at a predetermined stepping rate thereby to condition the receiver to receive signals at each of said predetermined frequencies for a first predetermined period of time. The combination further includes means operative after a predetermined delay period for holding the receiver tuned to individual ones of said frequencies in response to reception of a signal thereat, and means for increasing the stepping rate of the switching means in synchronism with tuning of the receiver to selected ones of said portions whereby the receiver is unable to lock onto the selected frequencies.

In a specific embodiment of the invention, wherein the receiver is further provided with luminous indicators for indicating the channel to which the receiver is tuned, the scanning control circuit further includes means for disabling the luminous indicators of the selected channels.

In yet another specific embodiment of the invention wherein the receiver is provided with at least two radio frequency portions, two mixers, and two oscillators, each of the associated radio frequency sections, mixers, and oscillators being adapted to convert radio frequencies in different radio frequency bands, the scanning control circuit is provided with means for preventing incidental operation of the other of the local oscillators.

In another specific embodiment of the invention wherein the receiver is adapted for reception of signals in two or more bands, the scanning-control circuit includes a crystal socket panel adapted to receive each crystal therein in a selected one of two poitions, the position determining to which local oscillator each of the crystals is connected.

In still another specific embodiment of the invention, the receiver includes a novel combination "squelch" and sensitivity control which enables adjustment of the "squelch" and "holding" circuits to thereby determine the strength of a signal required to lock the receiver on a channel and also provides for adjustment of the sensitivity of the receiver to exclude reception of weak signals.

It is therefore an object of the invention to provide an improved scanning-control circuit for a signal-seeking radio receiver.

It is another object of the invention to provide such a circuit which reduces the scanning cycle of the receiver in direct proportion to the number of channels to which the receiver can lock.

It is yet another object of the invention to provide such a circuit wherein the scanning rate of the receiver is controlled by a pulse generator which includes an alternative timing-circuit means which operates in response to tuning of the receiver to selected ones of the predetermined frequencies for increasing the pulse repetition rate thereof.

Another object of the invention is to provide such a scanning-control circuit wherein luminous channel indicators of selected channels are disabled.

Yet another object of the invention is to provide for use in a receiver adapted to receive signals in two or more different frequency bands a crystal socket panel which enables selectively connecting the individual crystals to a selected one of a plurality of local oscillator means without the use of external, additional, or movable wires, jacks or the like.

Another object of the invention is to provide a signal-seeking radio receiver wherein the "squelch" control further functions as a sensitivity control.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein.

DESCRIPTION OF THE PREFERRED EMBODIMENT

Figure 1:
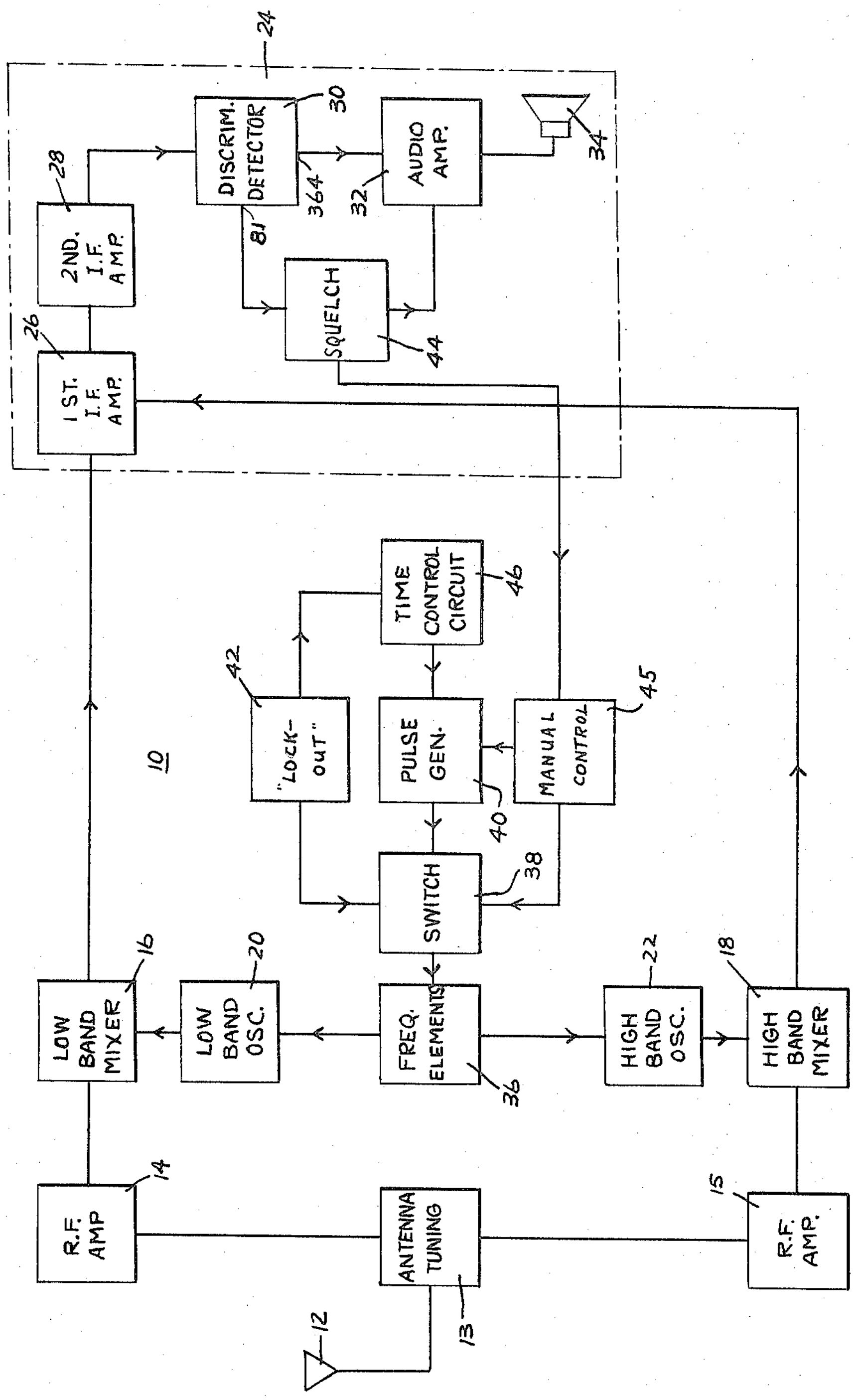
FIG. 1 is a block diagram of a signal-seeking radio receiver in accordance with the present invention, the receiver being provided with two "front-end" portions each of which is adapted to receive radio frequency signals in a different radio frequency band.

Referring now to the drawings, there is illustrated in FIG. 1 a block diagram of an improved, signal-seeking radio receiver 10 in accordance with the present invention. The receiver is adapted for reception of radio frequency signals in two different radio frequency bands such as, for example, a low frequency band containing signals between 30 and 50 megahertz and a high band containing signals from 146 to 174 megahertz. The receiver includes an antenna 12 which is coupled to an antenna tuning circuit 13. A low band radio frequency amplifier 14 and a high band radio frequency amplifier 15 are both connected to the antenna tuning circuit 13 to receive radio frequency signals therefrom. Signals pass from low band and high band RF amplifiers 14, 15 into low band and high band mixers 16 and 18, respectively. Individual oscillator means 20, 22 (FIGS. 1 and 5) are provided for generating low and high band local oscillator signals for injection into the low and high band mixers 16 and 18, respectively.

The balance of the receiver converting and demodulating circuitry 24 may be conventional, such a receiver portion, for example, being described in U.S. Pat. No. 3,531,724 to George H. Fathauer and assigned to the assignee of the present invention. This portion of the receiver includes a first intermediate frequency (IF) amplifier 26, second IF amplifier 28, a discriminator-detector 30, audio amplifier 32, and a speaker 34. This portion of the circuit may of course assume other configurations, numerous of which are well known to those skilled in the art.

In the preferred embodiment of this invention, the oscillators 20, 22 are crystal controlled, (FIG. 5) and may be of conventional design, typical being those disclosed in U.S. Pat. No. 3,531,724, Pat. No. 3,470,481, or in co-pending application to George H. Fathauer, Ser. No. 303,016, filed Nov. 2, 1972 entitled "IMPROVEMENTS IN SIGNAL-SEEKING RADIO RECEIVERS."

Figures 2, 5:
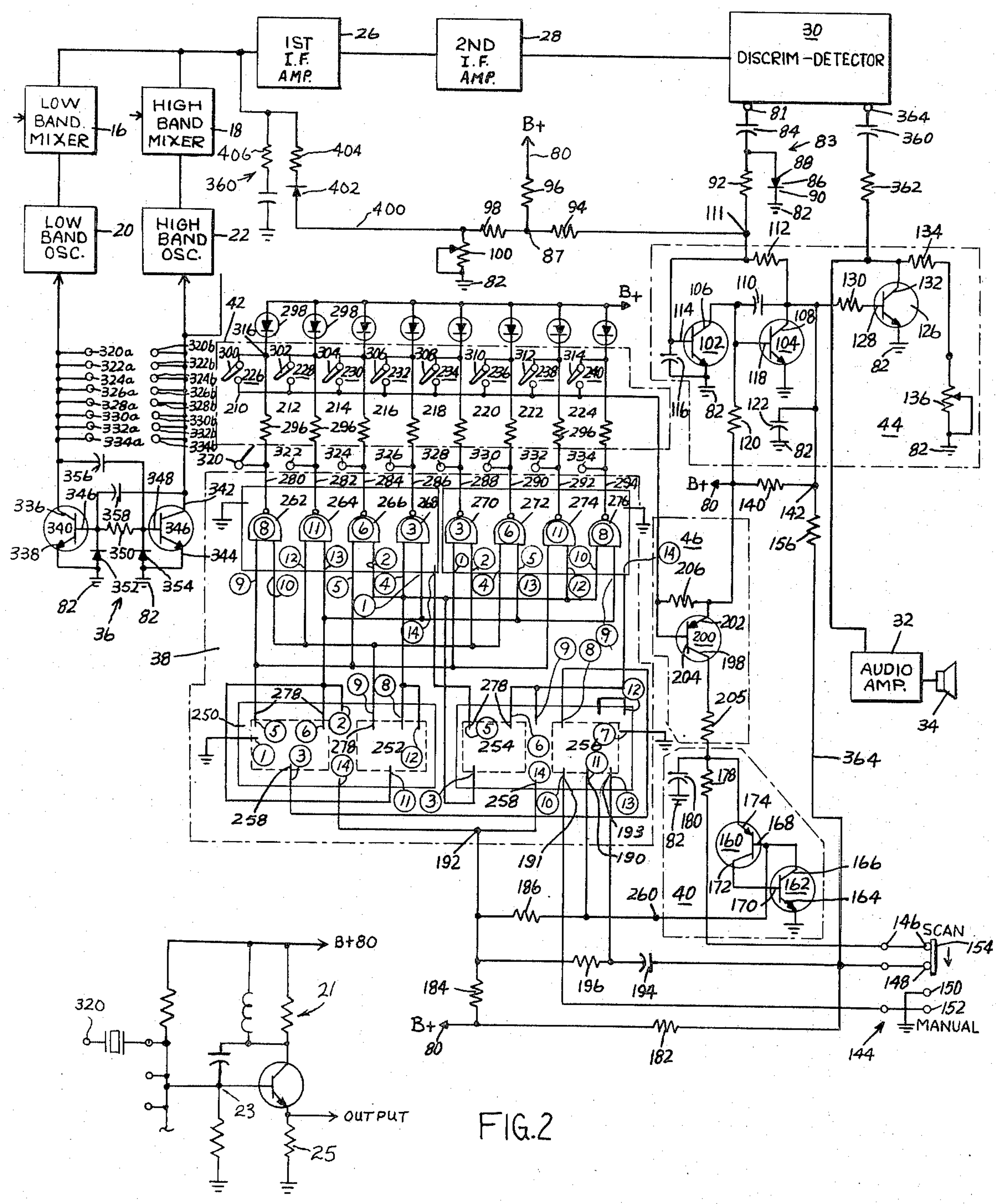
FIG. 2 is an electrical schematic of the scanning-control circuit of the present invention with portions of the receiver shown therewith in block diagram format.
FIG. 5 is a schematic diagram of one of the local oscillators.

Referring to FIG. 5 an example of such an oscillator is shown which includes a tank circuit 21, base-biasing circuit 23, and an emitter resistor 25 from which an oscillator output signal is taken. This circuit suffices for both oscillators 20 and 22 with the exception that the oscillator 22 preferably includes frequency tripling circuitry which provides an output frequency three times the fundamental. Other oscillator configurations may be used without departing from the spirit and scope of this invention.

Figures 3, 4:
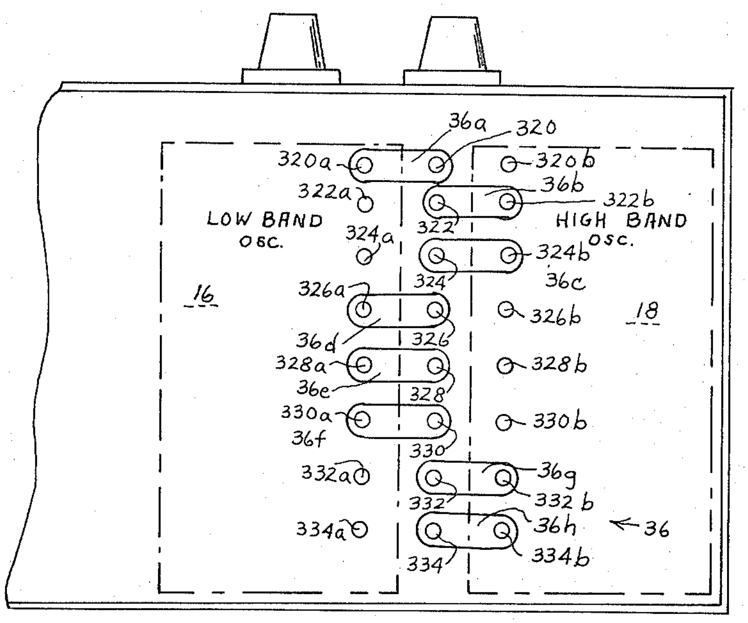
FIG. 3 is a plan view showing the novel crystal socket panel for use with the scanning-control circuit.
FIG. 4 is a "truth" table useful in understanding the switching logic of the scanning circuit.

A plurality of frequency determining elements are indicated in FIG. 1 by block 36, which includes, for example, crystals 36a through 36h shown in FIG. 3. The frequency determining elements 36 are individually and sequentially connected to one or the other of low band oscillator 20 and high band oscillator 22 by an electronic switch circuit 38. Switch circuit 38 is in turn driven by a pulse generator 40. A selecting or lock-out circuit 42 is provided for manually locking out selected ones of the frequency determining elements 36 such that the receiver cannot hold or otherwise remain tuned to those frequencies corresponding to the locked out elements as will be described in detail below. Operation of pulse generator 40 is automatically controlled by a "squelch" circuit 44 which is coupled to the discriminator-detector 30. In the alternative, switch circuit 38 may be manually incremented by means of a manual control 45. Operation of the pulse generator 40 is altered by means of a time constant control circuit 46 which effects a reduction in the scanning cycle of the receiver 10.

Referring now to FIG. 2, there is shown the circuitry of the automatic sequential switching portion of the receiver 10 which includes a pulse generator 40, squelch circuit 44, electronic switch circuit 38 and lock-out circuitry 42, manual control 45 and connections for the frequency determining elements and associated circuitry 36 (not shown in FIG. 2). As is described in the above referenced U.S. Pat. No. 3,531,724, a signal may be derived from detector 30 whenever a signal is received by receiver 10, the signal appearing at terminal 81 of discriminator-detector 30. Conversely, when no radio frequency signal is being received by the receiver 10, no signal is generated within the receiver, and no IF signal will appear at output terminal 81 of discriminator-detector 30. Typically, this signal is referred to as a "squelch" signal and will be alternating current. Terminal 81 is in turn coupled to a detector circuit 83 which includes a capacitor 84 and a diode 86, diode 86 having its anode 88 connected to capacitor 84 and its cathode 90 to ground 82. Anode 88 is connected to a source 80 of positive direct current voltage via resistors 92, 94, and 96. The commonly connected terminal 87 of resistors 94 and 96 is coupled to ground 82 via a resistor 98 and variable resistor 100.

Squelch circuit 44 is connected to the junction 111 of resistors 92, 94 and includes a pair of transistors 102, 104. The collector 108 and base 118 of transistor 104 are coupled together via a capacitor 110. Collector 108 is connected to the terminal 111 by a resistor 112. Base 114 of transistor 102 is also connected to terminal 111 and is coupled to ground 82 by a capacitor 116. Base 118 of transistor 104 is connected directly to collector 106 and to B+ source 80 via a biasing resistor 120. Collector 108 is coupled to ground 82 via a bypass capacitor 122.

A switching transistor 126 has its base 128 coupled to collector 108 via a series connected resistor 130. A resistor 134 and a variable resistor 136 are connected between collector 132 and ground 82.

A three position "scan-manual" switch 144 includes contacts 146, 148, 150 and 152. Contacts 146, 148, contacts 148, 150 and contacts 150, 152 may be selectively connected together in pairs by means of a sliding armature 154. Contact 148 is connected to B+ via resistors 140, 156, and terminal 142 therebetween is connected to collector 108.

Pulse generator circuit 40 includes first and second pulse generator transistors 160, 162, the emitter 164 of transistor 162 being coupled to ground 82 and the collector 166 to the base 168 of transistor 160. Base 170 is connected to collector 172 of transistor 160. Emitter 174 is coupled to B+ 80 through a resistor circuit which includes resistors 178, 140, 156 and 182, and switch 144, when the latter is in its "scan" position, i.e., armature 154 bridging contacts 146, 148, and is also coupled to B+ source 80 via a resistor 205 and a transistor 200 when the latter is conductive. A charging capacitor 180 is connected between collector 174 and ground.

Biasing voltage is applied to base 168 and collector 166 via resistors 184, 186. The output terminal of pulse generator 40 is common to collector 166 which is connected to input terminal 190 of switch circuit 38.

Emitter 174 is also connected to the collector 198 of switching transistor 200 of time constant control circuit 46. Transistor 200 has its emitter 202 connected directly to B+ 80 and its base 204 connected to B+ 80 via a resistor 206. Base 204 is also connected to the commonly connected terminals 210 through 224 of a plurality of manually operable selector switches 26 through 240.

Switch circuit 38 comprises a plurality of flip-flop circuits 250, 252, 254, and 256 having input terminal 190 thereof coupled to collector 166. In operation, flip-flop circuits will perform a single step or switching function in response to the successive occurrence of a positive and a zero (less than 1 volt) signal applied to input terminal 190. In the alternative, flip-flops 250–256 will complete one switch cycle in response to the application of two successively occurring zero pulses, one each, to input terminals 191, 193, in that order.

A plurality of NAND gates 262 through 276 are connected to the output terminals 278 of flip-flops 250 through 256 as shown. In a specific embodiment, flip-flops 250 through 256 are integrated circuits as are also NAND gates 262 through 276. Specific integrated circuits which may be used for circuits 38 are listed at the end of this specification and the circled numbers in FIG. 2 denote the pin numbers used in connecting the circuits. Such circuits are well known in the prior art and the specific switch circuit illustrated is presented only as an example, it only being necessary that the circuit provide a grounding signal at its output terminals 280 through 294 individually in sequence, such a sequence being illustrated in the table of FIG. 4.

In the table of FIG. 4, the numeral "1 " denotes an "on" or positive voltage signal while a "0" denotes an "off" or zero voltage signal. The "*"'s denote a ground connecton.

Connected electrically in series between B+ 80 and each one of the output terminals 280 through 294 is a current limiting resistor and light emitting diode as at 296, 298, respectively. Swtches 226 through 240 each have their respective armatures 300 through 214 connected to the cathodes of light emitting diodes 298 as at 316. Also individually connected to predetermined ones of output terminals 280 through 294 are first sockets 320 through 334.

A second plurality of sockets **320*a* through 334*a* are connected in common to low band oscillator 20, and a third plurality of sockets 320*b* through 334*b* are connected in common to the high band oscillator 22. Sockets 320*a* through 334*a* are connected through the collector 336 and emitter 338 of transistor 340 to ground 82. Sockets 320*b* through 334*b* are connected through the collector 342 and emitter 344 of a second transistor 346 to ground 82. The bases 346, 348 of transistors 340,346 are coupled together via a resistor 350 and to ground 82 by diodes 352,354, respectively, as shown. Base 348 is coupled via a capacitor 356 to sockets 320*a* through 334*a* and base 346 is coupled by a capacitor 358 to sockets 320*b* through 334*b*.**

Preferably, sockets 320 through **334, 320*a* through 334*a*, and 320*b* through 334*b* are arranged in a geometric array as shown in FIG. 3 whereby frequency determining elements 36*a* through 36*h*, typically conventional "plug-in" crystals, may be selectively inserted between adjacent ones of sockets 320 through 334 and 320*a* through 334*b* or 320 through 334 and 320*b* through 334*b*. It will be observed that insertion of a crystal 36*a* through 36h between respective ones of sockets 320 through 344 and adjacent ones of sockets 320*a* through 334*a* will connect that one of the crystals to the low band oscillator 20 while insertion of a crystal between one socket 320 trrough 334 and a respective socket 320*b* through 334*b* will connect the crystal to the high band oscillator 22.**

The operation of this portion of the circuit will now be explained. Assuming that no signal is being received by the receiver 10, no intermediate frequency signal will be produced within the receiver circuitry. Correspondingly, no IF signal will appear at terminal 81 of discriminator-detector 30. Simultaneously, B+ potential passes from B+ supply 80 through resistors 96, 94, and 92 and diode 86 to ground 82, thereby producing a positive potential at terminal 111. This positive potential is applied to base 114 whereby transistor 102 is forwardly biased and turned "on." When transistor 102 is "on," its collector 106 is at or near ground potential thereby applying this potential to the base 118 of transistor 104 biasing it "off." This maintains collector 108 near B+ potential. This latter potential is applied to the base 128 of transistor 126 biasing it "on" whereby transistor 126 shunts resistor 134 and variable resistor 136. The audio signal path from discriminator-detector 30, which normally flows through capacitor 360 and resistor 362 to audio amplifier 32, and which signal is imposed across the load comprising resistor 134 and variable resistor 136, is shunted to ground 82 through transistor 126.

The positive potential appearing at collector 108 maintains the positive potential at terminal 142 at a predetermined positive potential, this potential being applied via conductor 364 and resistors 156, 178 to pulse generator 40. This causes a charge to develop on capacitor 180. A positive potential of magnitude less than the aforementioned potential is applied to base 168 of transistor 160 via resistors 184 and 186. Consequently, when the charging potential on capacitor 180 reaches a sufficiently positive level, transistor 160 becomes forward biased and turns "on." When transistor 160 turns on, positive potential is applied to the base 170 of transistor 162 rendering it "on" whereby collector 166 thereof is essentially grounded. This in turn discharges capacitor 180, lowering the potential thereof, and rendering transistor 160 again nonconductive. It will now be observed that transistors 160, 162 comprise a relaxation oscillator which produces a repeating pulse signal at output terminal 260, this pulse signal being positive when transistor 162 is "off" and at essentially ground potential when transistor 162 is "on." This repeating pulse signal is in turn applied to input terminal 190 of switch circuit 38 to effect the sequential switching thereof.

As switch 38 proceeds through its switching sequence, output terminals 280 through 294 thereof will, in sequence, be grounded, all of the other terminals thereof remaining at a positive potential. This sequential grounding of terminals 280 through 294, in sequence, grounds one terminal of a crystal *36a – 36h*. As each crystal is "grounded," it is activated thereby causing the low band oscillator 20 or high band oscillator 22 to oscillate at the frequency associated therewith.

Thus, it will be seen that as the crystals *36a – 36h* are sequentially energized, a plurality of different, discrete frequencies will be generated by the low band and high band oscillators 20, 22 for the purpose of converting received radio frequency signals received by the receiver.

It will further be observed that when a particular one of the crystals is oscillating, the alternating current signal occurring in respective ones of the oscillators 20, 22 will be applied via capacitor 356 or 358 to that one of transistors 340, 346 which is associated with the other of the oscillators 20, 22. This signal, in turn, renders the last mentioned transistor conductive thereby grounding all of the sockets *320a* through *334a* or *320b* through *334b* associated with the opposite one of the oscillators, i.e., the oscillator that does not at that moment have a crystal actively coupled thereto.

For example, assume that a crystal is connected between socket 320 and socket *320b* and output terminal 280 is momentarily grounded. This last mentioned crystal will be activated thereby causing high band oscillator 22 to oscillate. The oscillating signal from high band oscillator 22 will simultaneously pass through capacitor 358 to the base 346 of transistor 340 rendering the latter conductive. When transistor 340 is conductive, all of sockets *320a* through *334a* associated with low band oscillator 20 are grounded thereby preventing any extraneous oscillation or incidental signals from occurring therein. The sequence in which the receiver 10 tunes to different frequencies is determined only by the crystals *36a – 36h* and their positions in the sockets.

Sequential switching of switch circuit 38 will continue until a signal is received by the receiver 10. Correspondingly, the receiver 10 will be automatically and sequentially tuned to receive signals at the frequencies associated with the frequencies of crystals *36a* through *36h*.

When a signal is received, intermediate frequency signals and audio signals will appear at terminals 81 and 364 of discriminator-detector 30, respectively. The signal appearing at terminal 81 will be an alternating current "squelch" signal. The "squelch" signal is rectified by detector circuit 83 to produce a negative charge on capacitor 84 thereby lowering the potential appearing at terminal 111. As the potential at terminal 111 drops, transistor 102 will be rendered nonconductive. This change in conductivity will be delayed by a small time period by the charge on capacitor 116 which must discharge. The potential of collector 106 will then rise to a more positive potential which in turn increases the potential at base 118 to render transistor 104 conductive. The "turn on" of transistor 104 will also be delayed by reason of the charge on capacitor 110 which temporarily maintains the collector to base potential between base 118 and collector 108 at a level which holds transistor 104 nonconductive. As the capacitor 110 discharges, transistor 104 becomes conductive and transistor 126 is rendered nonconductive thereby removing the shunt from resistors 134 and variable resistor 136. This, in turn, permits the audio signal appearing at terminal 364 of discriminator-detector 30 to pass to the audio amplifier 32 for reproduction. Further, when transistor 104 is rendered conductive, it lowers the potential appearing at terminal 142 thereby effectively reducing the charging potential formerly applied to charging capacitor 180 below that required to forward bias transistor 160. Correspondingly, capacitor 180 cannot charge to a level sufficient to turn "on" transistors 160 and 162, and no repeating pulse signal is produced at collector 166. Correspondingly, switch circuit 38 ceases to sequence and the receiver will remain tuned to the signal to which it was tuned when it first received a signal.

When the signal being received by receiver 10 terminates or ceases, the signal appearing at terminal 81 will again disappear and the receiver 10 will resume sequential scanning as described above until another signal is detected.

In the above description it has been assumed that scanmanual switch 144 was in its "scan" position. However, it will be observed that when the scan switch 144 has its armature 154 moved into the "manual" position, terminal 148 thereof will be grounded to terminal 150 and the source of charging potential for charging capacitor 180 is thus removed. Under these conditions, pulse generator 40 and switch circuit 38 will remain static and sequential switching of the circuit will be terminated. Movement of the armature 154 to its third position bridging terminals 150, 152, will then apply a ground or negative pulse to switch circuit input terminal 191 via contact 152. When armature 154 is now moved back to a position bridging contacts 148, 150, capacitor 194 again has its one terminal grounded. Correspondingly, capacitor 194 causes a temporary ground on switch circuit input terminal 193. Thus, movement of armature 154 as described is seen to apply zero volt pulses to inputs 191, 193, thereby causing switch circuit 138 to perform a single switch cycle and tuning the receiver to receive the next frequency in its normal sequence.

In the above description it has also been assumed that all of switches 226 through 240 have had their armatures 300 through 314 in an "open" position. It will now be observed that if a particular one of armatures 300 through 314 is closed, i.e., placed in contact with a respective one of contacts 210 through 224, the base of transistor 200 will be connected to the cathodes of the light emitting diodes 298. Since the emitter 202 and the anodes of light emitting diodes 298 are both connected to B+ supply 80, the voltage drop across the light emitting diodes will be limited to the potential drop between base 204 and emitter 202. Further, a current path will be provided from the respective one of the output terminals 280 – 294 and the aforementioned switches to transistor 200. This will lower the potential applied to base 204 rendering transistor 200 conductive. When transistor 200 is conductive, an alternative charging path is provided through resistor 205 to charging capacitor 180. Thus, by using a resistance value for resistor 205 which is substantially less than the resistance of resistor 178, charging capacitor 180 will be caused to charge at a substantially faster rate than will occur when all of the switches 226 through 240 are "open." This alternative charging path will be present only when a respective one of terminals 280 through 294 is grounded, and the associated one of switches 226 through 240 is closed. Correspondingly, when the receiver is switched to that crystal, i.e., a crystal associated with a closed switch, pulse generator 40 will pulse at a substantially faster rate. By proper selection of component values, pulse generator 40 will be caused to pulse and switch the receiver to the next channel before transistors 102 and 104 can charge conductivity states, i.e., before capacitors 116 and 110 can discharge. Thus, irrespective of whether a signal is received or not, the receiver will be unable to remain locked to any channel for which the corresponding one of switches 226 – 240 is closed. This then effects a substantially faster switching action from one channel or frequency to the next respective channel whenever a channel is "locked out." It will be observed that this operation will, for each of the channels which is "locked out," substantially reduce the scanning cycle of the receiver and the receiver cannot lock onto a "locked out" channel, because of the time delay in the "squelch" circuit which does not permit the latter to respond to any signal that might pass through the IF before the receiver switches to the next channel.

It will further be observed that closure of any one of switches 226 through 240 will also limit the positive potential appearing across the corresponding one of the light emitting diodes 298 connected thereto as described above. This voltage will be substantially less than the potential drop required to cause light emitting diodes 298 to luminesce. This voltage drop will be less than that required to cause the light emitting diodes 298 to luminesce. It will thus be apparent that closure of selecting switches 226 through 240 will, simultaneously with locking out the respective crystal 36a through 36h coupled thereto, disable the light emitting diode 298 connected thereto, whereby, the light emitting diode 298 will remain extinguished.

It will further be observed that adjustment of variable resistor 100 will alter the bias potential applied to base 114 of transistor 102, this potential opposing that generated at terminal 81 of discriminator-detector 30. Therefore, variable resistor 100 will function as a sensitivity control for the receiver by requiring an increase or decrease in the magnitude required of the signal required to lock the receiver on a received channel.

In a specific embodiment of the invention, a positive potential may also be applied to the input circuit 360 of the first intermediate frequency circuit 26, which may be an integrated circuit, via a conductor 400, diode 402, and resistor 404. This potential is applied to the input of IF amplifier 26, the potential functioning to reduce the sensitivity of IF section 26. Increasing the potential above a predetermined threshold value will decrease the sensitivity of the receiver while reducing the potential will restore sensitivity. This operation is effected by the increase and decrease of the variable resistor 100 which adjusts "squelch" sensitivity.

Because a threshold value must first be exceeded before the receiver sensitivity is affected and because the sensitivity adjustment has a more substantial effect on the receiver when it reaches and exceeds threshold, adjustment of resistor 100 from one extreme to another controls squelch and receiver sensitivity in sequence although the control voltage applied is charged for both simultaneously.

From the above description it will be seen that scanning control circuit for use in a signal-seeking radio receiver as above described provides substantial improvements in the scanning operation of the receiver. Specifically, the present invention provides for improved "lock out" of selected channels whereby, when a channel is "locked out" the receiver scans that channel for a substantially reduced period.

Further, when scanning a "locked out" channel, the indicators 298 are not illuminated. The scanning cycle is reduced in proportion for each "locked out" channel. Further, the scanning control circuitry enables scanning of two separate frequency bands with a single scanning circuit. The selection of a combination of two or more of a low band, high band, or ultra-high frequency band is effected by selection of front end sections and the simple insertion of crystals or the like in novel socket panel provided on the receiver. The channels can be scanned in any desired sequence and no extraneous or movable wires, patch boards, jacks, or the like are required to set up the receiver to scan selected channels in a selected sequence.

Further, the scanning circuit provides for a combined squelch sensitivity control whereby the receiver can be selectively tuned not only to cancel out noise but also to pass over weak to moderately strong signals, this control being effected by the manipulation of a single control knob.

While there have been described above the principles of this invention in connection with specific apparatus, it is to be clearly understood that this description is made only by way of example and not as a limitation to the scope of the invention.

In a working embodiment of the invention, the following component values are used:

| | |
|---|---|
| **Integrated Circuits** | |
| 250, 252 | (one) SN7474 |
| 254, 256 | (one) SN7474 |
| 262, 268 | (one) SN7426 |
| 270,276 | (one) SN7426 |
| I.F. Amp. 26 | |
| **Transistors** | |
| 102, 104, 126, 162 | MPS3393 (Motorola) |
| 160,200 | 2N3640 (Motorola) |
| 340, 346 | 2N3563 (Fairchild) |
| **Diodes** | |
| 86, 352, 354 | 1N34A |
| 402 | 1N4148 |
| 298 | A259 Light Emitting |
| **Resistors** | |
| 92 | 10K ohms |
| 94 | 56K ohms |
| 96 | 5.6K ohms |
| 98 | 2.2K ohms |
| 100 | 10K variable |

-Continued

| Integrated Circuits | |
|---|---|
| 120 | 33K ohms |
| 130 | 10K ohms |
| 134 | 22 ohms |
| 136 | 100K variable |
| 140 | 1.5K ohms |
| 156 | 47K ohms |
| 178 | 470K ohms |
| 182 | 47K ohms |
| 184 | 100 ohms |
| 186 | 100 ohms |
| 196 | 47K ohms |
| 205 | 73K ohms |
| 206 | 4.7K ohms |
| 296 (8 places) | 470 ohms |
| 358 | 10K ohms |
| 362 | 47K ohms |
| 404 | 22K ohms |
| 406 | 4.7K ohms |
| Capacitors | |
| 84 | 0.001 MFd. (micro farads) |
| 110 | 0.22 MFd. |
| 116 | 0.01 MFd. |
| 122 | 150 pfd (pico farads) |
| 180 | 0.047 MFd. |
| 194 | 0.01 MFd. |
| 356, 358 | 22 pfd |

What is claimed is:

1. For use in a signal-seeking radio receiver for automatically and sequentially tuning to a plurality of predetermined radio frequencies the combination comprising: means for holding the receiver tuned to individual ones of said frequencies in response to reception of a radio frequency signal and means for reproducing the intelligence therein, said holding means including a. local oscillator means for generating a plurality of different local oscillator signals, said oscillator including predetermined portions which determine the frequencies of said oscillator signals, respectively;

b. switching means for automatically and sequentially activating said predetermined portions of said local oscillator means to thereby sequentially and repetitively generate said plurality of local oscillator signals individually in predetermined sequence;

c. indicating means coupled to said switching means and including a plurality of luminescing display elements, one for each said portion, for indicating that individual ones of said portions are activated;

d. switch driver means for controlling the time said switching means activates said predetermined portions, respectively;

e. first means responsive to a received radio frequency signal for stopping the sequencing of said switching means thereby to hold said local oscillator on one of its oscillator signals;

f. second means for selectively decreasing by a predetermined amount the time of activating individual ones of said predetermined portions and for preventing said first means from stopping said local oscillator on the oscillator signal corresponding to the one of said predetermined portions which is activated for the decreased time, said second means including a switching device operatively coupled to said display elements, said switching device being operable between conductive and non-conductive states, said second means further including circuitry for selectively extinguishing said display elements concurrently with decreasing the time of activation in response to one conductivity state of said switching device and selectively causing them to luminese when said activation time is not decreased in response to the other conductivity state of said switching device.

2. The combination of claim 1 wherein said switch driver means includes a pulse generator having therein a time-constant circuit, said second means being coupled to said time-constant circuit and including a plurality of manually operable and normally open switches individually coupled to predetermined ones of said portions, said switching device being a transistor switch operatively coupled to said manual switches and said time-constant circuit, said transistor switch being normally non-conductive, means biasing said transistor switch conductive in response to the simultaneous closure of one of said manual switches and activation of that one of said portions coupled thereto, said luminescent display elements being coupled electrically in parallel with individual ones of said manual switches and said transistor switch whereby individual ones of said luminescent display elements are electrically shunted in response to the closure of the corresponding ones of said manual switches and said transistor switch being rendered conductive.

3. The combination of claim 2 wherein said time constant circuit includes a charging capacitor and a resistor, said resistor being coupled between said charging capacitor and a source of positive potential.

4. The combination of claim 3 wherein said pulse generator, is a relaxation oscillator circuit including at least one transistor, said charging capacitor and resistor being connected to the collector of said transistor.

5. The combination of claim 2 wherein each of said portions includes a crystal having an active terminal coupled to said local oscillator means and a switching terminal, said switching means including means connecting said switching terminals individually to a first source of reference potential in predetermined time sequence, said portions being rendered individually operative when said switching terminal thereof is connected to said first source, said manual switches further being coupled between said switching terminals and a second source of potential through said transistor switch, said luminescent display elements each having one terminal thereof connected in common to said second source of potential and another terminal connected to said second source through a predetermined one of said manual switches and said transistor switch, whereby said second source is coupled to individual ones of said switching terminals and to both terminals of each said display element when the corresponding one of said manual switches coupled thereto is closed.

6. The combination of claim 5 wherein said switching transistor is a PNP transistor, the emitter of said switching transistor being coupled to said second source of operating potential, said manual switches being connected to the base of said transistor whereby, closure of one of said manual switches causes conduction of said switching transistor and the application of potential to said other terminal of said display element to thereby prevent illumination thereof.

7. The combination of claim 3 wherein said switching transistor includes an emitter and a collector and a second charging resistor in series therewith, said second charging resistor being series connected to said charging capacitor, a source of positive potential series connected to one of said emitter and collector and said second charging resistor being connected to the other, the resistance of said second charging resistor being less than the resistance of said first charging resistor whereby, when said switching transistor is rendered conductive, said charging capacitor is charged at a higher charging rate.

8. The combination of claim 6 where said luminescing indicator devices are light-emitting diodes.

9. The combination of claim 6 including a squelch circuit having a capacitor adapted to have one terminal connected to said receiver to receive a portion of an intermediate frequency signal therefrom, a voltage divider circuit connected between said second source of operating potential and the other terminal of said last mentioned capacitor, said voltage divider circuit including an intermediate voltage tap, a diode having its anode connected to said other capacitor terminal and its cathode connected to ground, circuit means including said squelch circuit capacitor, said voltage divider circuit, said first and second sources of operating potential and said diode for developing at said intermediate voltage tap a predetermined positive potential with respect to ground in the absence of an intermediate frequency signal being coupled to said squelch capacitor and another lower predetermined potential in the presence of such an intermediate frequency signal, a transistor switch circuit coupled to said intermediate voltage tap responsive to said predetermined potentials for controlling the operation of said switch driver means, an intermediate frequency amplifier having an input circuit, and means coupling said voltage divider circuit to said input circuit for controlling the sensitivity of said intermediate frequency amplifier, the potentials of said first source and ground being the same.

10. The combination of claim 9 wherein said transistor switch circuit includes a first squelch transistor having its base connected to said intermediate voltage tap, said first squelch transistor being rendered conductive in response to the absence of said intermediate frequency signal and non-conductive in response thereto, said transistor switch circuit further including a second squelch transistor, circuit means connecting said second squelch transistor to said first squelch transistor for rendering said second squelch transistor conductive when said first squelch transistor is non-conductive and non-conductive when said first squelch transistor is conductive, said second squelch transistor being coupled electrically in shunt with said first charging resistor, whereby, when said second squelch transistor is conductive, charging potential to said charging capacitor is reduced.

11. The combination of claim 10 further including an intermediate frequency amplifier, means coupling said voltage divider circuit to the input circuit of said intermediate frequency amplifier for controlling the sensitivity thereof.

12. The combination of claim 11 wherein said coupling means includes a variable resistor coupled between said intermediate tap and ground for selectively changing the potential at said intermediate voltage tap, said coupling means further including a diode connected between said variable resistor and said input circuit of said intermediate frequency amplifier.

13. The combination of claim 1 wherein each of said predetermined portions includes a plug-in crystal, a second local oscillator like the first, said local oscillators each generating a plurality of different frequency signals in different frequency spectra, there being a first set of socket elements connected to said first-mentioned oscillator and a second set of socket elements connected to said second oscillator, said switching means including a third set of sockets, there being one of said first sockets and one of said second sockets disposed adjacent to each of said third sockets, respectively, the spacing between each of said first sockets and said third sockets and between each of said second sockets and said third sockets being dimensioned to receive one of said crystals therein, whereby, each of said crystals may be selectively inserted into one of said first and third sockets and into one of said second and third sockets, insertion of a crystal into companion ones of said first and third sockets connecting the same to said first mentioned local oscillator and insertion of another crystal into companion ones of said second and third sockets connecting the same to said second local oscillator, respectively.

14. The combination of claim 13 further including a first grounding transistor connected between said first sockets and ground and a second grounding transistor connected between said second sockets and ground, a first signal-conducting circuit coupling a control element of said first grounding transistor to said second sockets and a second signal-conducting circuit coupling a control element of said second transistor to said first sockets, circuit means for rendering said first grounding transistor conductive in response to oscillation of any one of said crystals connected to said second sockets and said second grounding transistor conductive in response to oscillation of any one of said crystals connected to said first sockets.

15. The combination of claim 14 wherein said first signal-conducting circuit includes a capacitor connected between the base of said first grounding transistor and said second sockets, said second signal-conducting circuit includes a capacitor connected between the base of said second grounding transistor and said first sockets, there being a resistor connected between said bases, and diodes connected between each of said bases respectively and ground.

16. For use in a signal-seeking radio receiver for automatically and sequentially tuning to a plurality of predetermined radio frequencies the combination comprising means for holding the receiver tuned to individual ones of said frequencies in response to reception of a radio frequency and means for reproducing the intelligence therein, said holding means including:

a. local oscillator means for generating a plurality of different local oscillator signals, said oscillator means including predetermined portions which determine the frequencies of said local oscillator signals, respectively;

b. switching means for automatically and sequentially activating said predetermined portions of said local oscillator means to thereby sequentially and repetitively generate said plurality of local oscillator signals individually in predetermined sequence;

c. switch driver means for controlling the time said switching means activates said predetermined portions, respectively;

d. first means responsive to a received radio frequency signal for stopping the sequencing of said switching means thereby to hold said local oscillator means on one of said local oscillator signals;

e. said first means including a squelch circuit, an intermediate frequency amplifier, and means continuously adjustable between first and second conditions coupled to said squelch circuit and said intermediate frequency amplifier for selectively altering in sequence the sensitivity of said squelch circuit and said intermediate frequency amplifiers in response to adjustment of said continuously adjustable means between said first and second conditions.

17. The combination of claim 16 wherein said squelch circuit includes a capacitor having one terminal operatively connected to said intermediate frequency amplifier, a diode having its anode connected to the other capacitor terminal and its cathode to a first source of operating potential for rectifying an alternating intermediate frequency voltage applied to said anode thereby to provide a control signal representive of the presence and absence, respectively, of said intermediate frequency voltage; said sensitivity-altering means including a variable resistor connected between said first source and said other terminal of said capacitor.

18. For use in a signal-seeking radio receiver for automatically and sequentially tuning to a plurality of predetermined radio frequencies, the combination comprising means for holding the receiver tuned to individual ones of said frequencies in response to reception of a radio frequency signal and means for reproducing the intelligence therein, said holding means including:

a. first and second local oscillator means for generating a plurality of different local oscillator signals in different frequency spectra, each of said local oscillator means including predetermined portions which determine the frequencies of said local oscillator signals, respectively;
b. switching means for automatically and sequentially activating individual ones of said predetermined portions of said first and second local oscillator means to thereby sequentially and repetitively generate said plurality of local oscillator signals individually in predetermined sequence;
c. switch driver means for controlling the time said switching means activates said predetermined portions, respectively;
d. first means responsive to a received radio frequency signal for stopping the sequencing of said switching means thereby to hold said local oscillator means on one of said local oscillator signals;
e. each of said predetermined portions including a plug-in crystal, there being a first set of socket elements connected to said first-mentioned local oscillator means and a second set of socket elements connected to said second local oscillator means, said switching means including a third set of sockets, there being one of said first sockets and one of said second sockets disposed adjacent to each of said third sockets, respectively, the spacing between each of said first sockets and said third sockets and between each of said second and third sockets being dimensioned to receive one of said crystals therein, whereby, each of said crystals may be selectively inserted into one of said first and third sockets and into one of said second and third sockets, respectively, insertion of a crystal into companion ones of said first and third sockets connecting the same to said first local oscillator means and insertion of another crystal into companion ones of said second and third sockets connecting the same to said second local oscillator means, respectively.

19. For use in a signal-seeking radio receiver for automatically and sequentially tuning to a plurality of predetermined radio frequencies the combination comprising means for holding the receiver tuned to individual ones of said frequencies in response to reception of a radio frequency signal and means for reproducing intelligence therein, said holding means including:

a. first and second local oscillator means for generating a plurality of different local oscillator signals in different frequency spectra, each of said local oscillator means including crystals which determine the frequencies of said local oscillator signals, respectively;
b. switching means for automatically and sequentially activating said crystals of said first and second local oscillator means to thereby sequentially and repetitively generate said plurality of local oscillator signals individually in predetermined sequence;
c. switch driver means for controlling the time said switching means activates said crystals, respectively;
d. first means responsive to a received radio frequency signal on one of said frequencies for stopping the sequencing of said switching means thereby to hold said one of said first and second local oscillator means on the corresponding use of said local oscillator signals;
e. a first grounding transistor connected between ground and one terminal of all of the crystals associated with said first local oscillator means and a second grounding transistor connected between ground and one terminal of all of the crystals associated with said second local oscillator means, a first signal-conducting circuit coupling a control element of said first ground transistor to said ones of the terminals of said crystals associated with said second local oscillator means and a second signal-conducting circuit coupling a control element of said second grounding transistor to said ones of the terminals of said crystals associated with said first local oscillator means, circuit means for rendering said first grounding transistor conductive in response to oscillation of any one of said crystals associated with said second local oscillator means and said second grounding transistor conductive in response to oscillation of any one of said crystals associated with said first local oscillator means.

* * * * *

Disclaimer 3,821,651.—*George H. Fathauer*, Decatur, Ill., and *Cecil E. Mathis*, Indianapolis, Ind. SCANNING CONTROL CIRCUIT FOR USE IN SIGNAL-SEEKING RADIO RECEIVER. Patent dated June 28, 1974. Disclaimer filed May 25, 1978, by the assignee, *Masco Corporation of Indiana.*

Hereby enters this disclaimer to claims 1–19 of said patent.

[*Official Gazette July 18, 1978.*]